United States Patent [19]

Shahlapour

[11] Patent Number: 4,977,685
[45] Date of Patent: Dec. 18, 1990

[54] PLANAR THICKNESS GAUGE

[76] Inventor: Farrokh Shahlapour, 1853 N. Neva, Chicago, Ill. 60635

[21] Appl. No.: 383,661

[22] Filed: Jul. 24, 1989

[51] Int. Cl.$^5$ .............................................. G01B 7/02
[52] U.S. Cl. ........................................ 33/783; 33/833; 33/501.6; 33/533
[58] Field of Search ................. 33/783, 784, 533, 820, 33/818, 815, 832, 833, 501.6, 700, 1 BB, 558, 561, 549

[56] References Cited

U.S. PATENT DOCUMENTS

| | | | |
|---|---|---|---|
| 2,217,509 | 10/1940 | Bryant | 33/815 |
| 4,014,424 | 3/1977 | Hall . | |
| 4,064,534 | 12/1977 | Chen et al. . | |
| 4,538,913 | 9/1985 | Anthon . | |
| 4,539,754 | 9/1985 | Antony et al. | 33/549 X |
| 4,602,359 | 7/1986 | Palmer . | |
| 4,689,892 | 9/1987 | Kirven . | |

FOREIGN PATENT DOCUMENTS

| | | | |
|---|---|---|---|
| 1341344 | 9/1963 | France | 33/349 |
| 1231394 | 5/1986 | U.S.S.R. | 33/832 |

Primary Examiner—Harry N. Haroian
Attorney, Agent, or Firm—Leydig, Voit & Mayer

[57] ABSTRACT

A thickness gauge particularly adapted to measuring flatness of conductive sheets such as a steel workpiece. The tester includes a pair of opposed members translatable toward each other for supporting first and second planar electrical contacts. One of the contacts is disposed to support the workpiece to be gauged, and an electrical circuit is connected to the pair of contacts, to be completed when the contacts are both in contact with the workpiece. Means are provided for maintaining the parallelism of the contacts while relatively displacing them toward each other. Upon completion of the circuit, means are provided for determining the gap between the contacts which is a measure of the thickness and out-of-flatness of the sheet across the measured plane. Means are provided for setting a pass/fail limit for flatness, said limit preferably being set as an allowable gap between the electrodes before the circuit is completed such that if the allowable gap is attained before the circuit is completed, the sheet is determined to be within standards.

21 Claims, 3 Drawing Sheets

PLANAR THICKNESS GAUGE

FIELD OF THE INVENTION

This invention relates to measurement of gross sheet thickness, and more particularly to a reliable and simple-to-operate gauge capable of measuring sheet flatness.

BACKGROUND OF THE INVENTION

Many forms of thickness measuring gauges are available with localized measurement devices, such as a pair of calipers, being a typical example. Sometimes it is important to determine the overall flatness of a planar sheet, and in those cases use of a localized measuring device such as a set of calipers is not entirely satisfactory because the localized measurements do not give an indication of the gross variations from planarity which are characteristic of a sheet of uniform thickness but nonuniform flatness.

Flatness testing apparatus of various configurations is also available. Such devices can rely on numerous technologies; for example, flatness testers have been configured utilizing optical principles, pneumatic principles, principles of mechanical contact, proximity and the like. While such devices are typically suited to their particular needs, one application where a suitable device is not currently known to be available is in the steel producing industry where steel sheets or stampings are to be produced which not only have a thickness tolerance but also an allowable flatness tolerance. While the steel production environment is not known for its cleanliness or quiet, it is often desirable to run the necessary quality control tests on the produced sheets right in the production environment, and by a production worker.

Flatness tests have been conducted in that environment by mechanical means involving the use of a surface plate and feeler gauges The surface plate is a plate presenting a flat surface on which the sheet to be measured is placed, and an operator manually attempts to insert feeler gauges between the sheet and the surface plate. If it is possible to insert a feeler gauge of a predetermined thickness between those elements at their point of widest separation, it is determined that the sheet is of unacceptable flatness and the sheet is rejected. However, it can well be appreciated that such a procedure is subject to substantial error and variability since it is up to the operator to determine the point at which the feeler gauge is to be inserted, the operator has the opportunity to vary the force at which he attempts to insert the feeler gauge, the sheets are typically of relatively thin flexible material and mechanical deformation by the feeler gauge or otherwise could affect the result, etc. Thus, the mechanical test is unacceptable in terms of difficulty and time consumption, and is also operator sensitive and subject to error and unacceptable reliability.

SUMMARY OF THE INVENTION

In view or the foregoing, it is a general aim of the present invention to provide a testing device for determining the thickness and/or flatness of a conductive sheet in a simple yet reliable manner, which can be operated in an adverse environment, and which requires little skill and/or attention on the part of the tester operator.

In that regard, it is an object of the present invention to provide a flatness testing device which defines a pair of planes confining the workpiece to be tested and determines the maximum separation between those planes as a gross measure of flatness deviation over the plane of the sheet.

In accordance with another aspect of the invention, an object is to measure the flatness of a conductive sheet utilizing electrical means which signals the operator to indicate the point at which the total flatness measurement is to be taken.

Accordingly, the invention provides a planar thickness testing device for conductive planar workpieces which have a predetermined nominal thickness and an allowable flatness tolerance. The tester includes a base plate which carries a planar electrical contact and a platen which carries a second planar electrical contact. The base plate and platen are arranged to move the electrical contacts toward each other in parallelism to encompass a workpiece disposed on the base plate. The tester includes an electrical circuit which includes the first and second electrical contacts, the electrical circuit intended to be completed by the workpiece when both of the contacts are in contact with the workpiece. The electrical circuit includes means for initiating a measurement of the gap between the contacts upon completion of the electrical circuit as a measure of the thickness of the workpiece.

In its preferred embodiment, the tester includes limit means for establishing a predetermined gap between the electrodes which accommodates the workpiece nominal thickness and an allowable out-of-flatness tolerance. The electrical circuit cooperates with the limit means to prevent completion of the electrical circuit if the thickness and out-of-flatness dimension of the workpiece is less than the thickness and tolerance associated with the limit means. Means are also provided for indicating the completion of the electrical circuit as a means for signaling that the workpiece has an out-of-flatness dimension which exceeds the allowable tolerance.

Other objects and advantages will become apparent upon reference to the following detailed description when taken in conjunction with the drawings in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
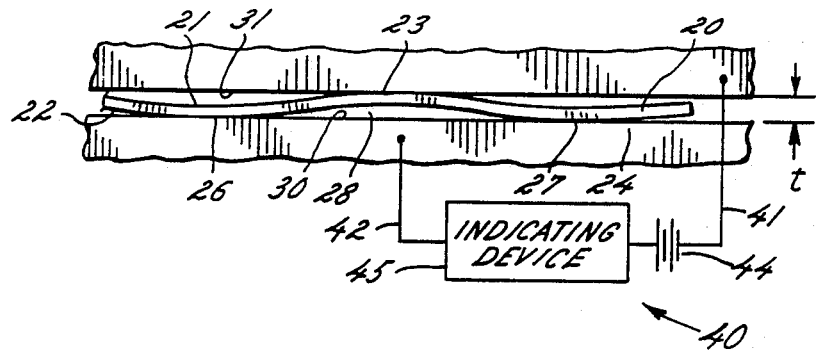
FIG. 1 is a diagram illustrating the problem of measuring sheet flatness, and a simplified schematic form of the invention for determining sheet flatness.

Turning now to the drawings, FIG. 1 illustrates the principles of the invention as applied to a sheet of material intended to be flat, but which is imperfect in that it deviates from true planar flatness. The type of sheet of interest herein is that which is conductive (or which can be rendered conductive, such as by applying a thin coating for purposes of the test). The steel industry provides a good example for the use of such tester where sheets of various kinds are rolled and cut or stamped for use in various applications. An exemplary application is that of motor laminations which are intended to be planar, are typically not very large, but often have a fairly tight tolerance on flatness. The flatness tolerance results from the end use requirement that a number of laminations must be stacked together in order to form a motor stator or rotor, and small deviations from flatness within each lamination can add up to a significant deviation when a number of laminations are stacked together.

Thus, while the following description will focus on a device of the size capable of quickly, efficiently and reliably testing rather small steel workpieces such as motor laminations, it will be apparent that the invention can be scaled upwardly or downwardly to test much larger sheets or much smaller sheets as the occasion demands. The term workpiece as applied to the sheet to be tested is intended to encompass sheets across this size range.

FIG. 1 illustrates, in front elevation, a workpiece 20 of conductive material intended to be flat but having a slight curvature representing a deviation from flatness. More particularly, it is seen that the workpiece includes an upper surface 21 and a lower surface 22 which are parallel in the gross sense (i.e., over the plane of the piece), but which have minor undulations resulting in peaks 23 and valleys 24 which define a deviation from perfect flatness. For example, the workpiece has a pair of low points 26, 27; if a plane is interposed between the low points 26, 27 it will be seen that there will be a gap 28 between the plane and the lower surface 22 of the workpiece as it is defined near the peak 23. Since FIG. 1 shows only a small portion of the overall workpiece and only one of the two planar dimensions from which flatness will deviate, it will be appreciated that the problem of measuring gross flatness across a substantial plane (say, one foot square or less, for example) will be substantial.

In practicing the invention, a pair of parallel planes 30, 31 are defined, the planes having planar areas at least as large as the workpiece (or portion of the workpiece) whose planarity is to gauged, and such planes are maintained in parallelism with each other while brought into bracketing relationship with the workpiece 20 in order to gauge flatness. As will be described below, mechanical means are preferably provided for guiding the movement of the planes 30, 31 toward each other to maintain parallelism. Means are also provided for sensing common contact between the planes and the workpiece to determine the gap between the planes at the point in time when both are initially in contact with the workpiece, that gap serving as a measure of sheet thickness and gross deviation from planarity or flatness.

Thus, in order to measure the planarity of a workpiece 20, the piece will first be placed on the lower or supporting plane 30 and will assume a rest condition. If the sheet 20 were perfectly flat, it would be in substantial contact with the planar supporting plate 30. However, in the normal case, when the sheet has some degree of curvature or other defect which renders it other than flat, the sheet will be supported on the plane 30 but will leave gaps between the lower surface of the sheet and the plane. That defect is illustrated in FIG. 1 as points 26 and 27 which support the sheet 20 on the plane 30 but leave an intermediate gap 28 between the lower surface of the sheet and the upper surface of the supporting plane 30. Having thus positioned the workpiece 20 in the apparatus for measurement, the upper parallel plane 31 is then advanced toward the plane 30 while monitoring contact of the plane 31 with the upper surface 21 of the sheet 20. The instant the plane 31 makes contact with the upper surface 21 of the sheet 20, it is known, since the sheet is supported on its major lower projections on the plane 30, that a parallel plane 31 has encountered its most prominent upward projection 23. For purposes of this embodiment, the gap t between the planes 30 and 31 at that time is defined as a measure of curvature or non-flatness of the sheet. When, as it typical, the thickness of the sheet 20 is known, the sheet thickness can be subtracted from the gap t between the planes 30, 31 at the instant of contact, and the difference $\Delta t$, is used as a measure of the curvature or non-planarity of the sheet. It will become apparent to those skilled in this art that other definitions can be utilized, and that described in connection with the embodiment of FIG. 1 is only exemplary.

In practicing the invention, automatic means are provided for signalling the instant of initial contact between the upper and lower planes 30, 31 and the intermediate workpiece 20. In the FIG. 1 embodiment, such means includes an electrical circuit 40 which has connections 41, 42 for connection to elements defining the planes 30, 31. More particularly, as will be described in connection with subsequent figures, the planes 30, 31 are defined by planar electrical contacts, and such contacts are included by means of connections 41, 42 in the electrical circuit 40. The electrical circuit 40 also includes an electrical source 44 and an indicating device 45. Recalling that the workpiece 20 is conductive, it will be appreciated that when the contacts 30, 31 are advanced toward each other with a workpiece 20 in place, at the instant when the second contact 31 first touches the workpiece 20, the electrical circuit 40 will be completed, allowing current flow from the source 44 through the electrodes 30, 31 and the interposed workpiece 20. That current flow energizes the indicating device 45 to signal the operator that the gap t then defined between the planes 30, 31 is a measure of the nonplanarity of the workpiece 20 then being gauged. The indicating means 45 as will be described in greater detail below, can itself provide a quantitative indication of the gap t or, a quantitative indication of the non-planarity (gap less nominal thickness) or a qualitative output indicating whether the sheet is within allowable tolerance. In other circumstances, the system of FIG. 1 may be used as a pass/fail quality control device which provides two indications, one associated with workpieces within tolerance limits and a second associated with those which should be rejected. It is appreciated that the exemplary system described herein "completes" the electrical circuit upon common contact of the electrical contacts with the workpiece. The term "completes" is used in its generic sense to signal a change in state in a circuit. Such a change can, for example, close a circuit to allow current flow (as in the illustrated embodiments), but can also terminate current flow in a circuit, such as for example, by imposing a shunt across the circuit.

Figure 2:
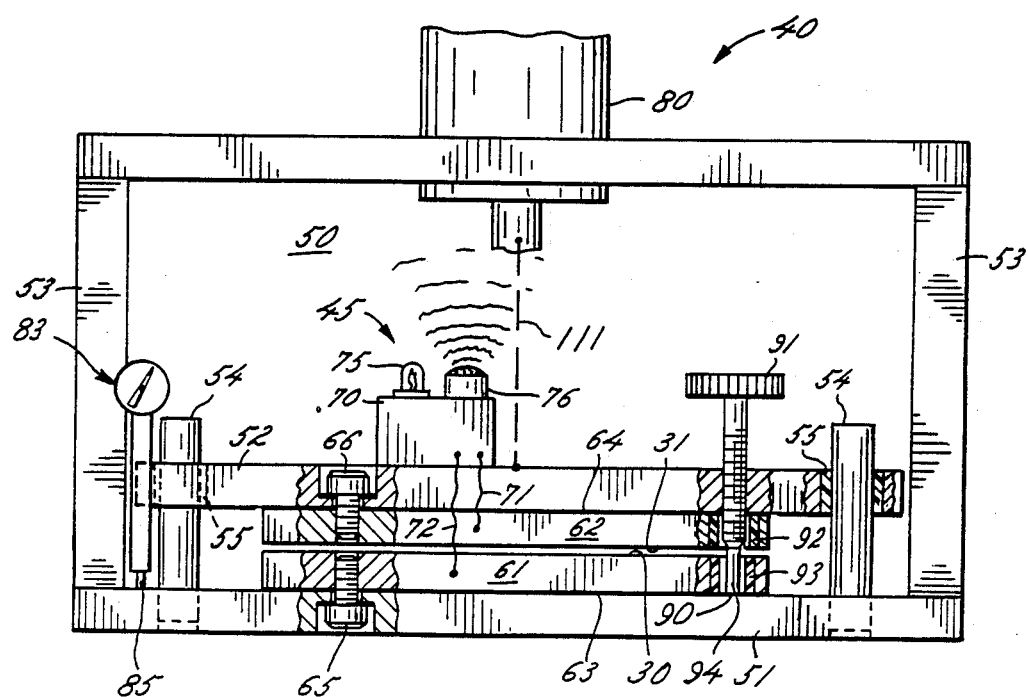
FIG. 2 is a front elevational view of a flatness tester constructed in accordance with the present invention.

Turning now to FIG. 2, there is shown a further embodiment of the present invention for gauging the thickness or flatness of conductive workpieces. FIG. 2 shows a flatness testing apparatus generally indicated at 50 which has a structure dependent on a pair of substantially rigid plates including a base plate 51 and a second plate or platen 52. A frame generally indicated at 53 is affixed to the base plate for providing rigidity. Also affixed to the base plate are a pair of linear guides 54 which cooperate with linear bearings 55 in the platen 52 for allowing relative movement between the plates 51, 52 while maintaining parallelism between those plates. The frame 53 and plates 51, 52 are not unlike that of a die set which allows relative movement between a pair of substantially rigid members while maintaining the parallelism of those members.

In practicing the invention, a pair of conductive planar electrodes are associated with the plates 51, 52, and such planar electrodes are electrically isolated from the frame to be connected in a circuit intended to include the workpiece to be measured, the circuit serving as a gauge for determining the flatness of the workpiece. To that end, a pair of conductive plates 61, 62 are provided and are affixed to the base and upper plates 51, 52, respectively. The plates are shown as relatively thick elements, but will typically be relatively thin contact members which rely for their planarity on the base plate and platen, respectively. Insulation means are provided at 63, 64 and are associated with affixing means 65, 66 to assure that the conductive plates 61, 62 are not in electrical connection with the remainder of the structure. The floating electrical nature of the plates 61, 62 (only one need actually float although both should be floating as is preferred) is provided to allow the electrical circuit to remain open or incomplete until the plates first make initial contact with a workpiece disposed therebetween. Thus, it will be the workpiece when contacted by the pair of opposed plates which will complete the circuit (rather than any short circuits through the apparatus) and completion of the circuit can be used as an indicator that the gross thickness of the plate including curvature or other out-of-flatness imperfection in the measured sample has been gauged.

The electrical circuit means in the embodiment of FIG. 2 is housed in an enclosure 70 which includes an electrical source (not separately illustrated) such as the battery 44 of FIG. 1. It is seen that wire connections 71, 72 connect the electrical power source within the housing 70 to the respective plates 61, 62. Connected in the electrical circuitry are also indicator devices generally indicated at 45. In the FIG. 2 embodiment, the indicator devices are both audible and visual, and include an indicator light 75 and an audible indicator 76 in the form of a buzzer or bell. While the circuit can be configured in various ways, in the simplest and preferred form of the invention, when the circuit between the plates 61, 62 is open, both of the indicators 75, 76 are quiescent, that is, the light bulb is extinguished and the buzzer is silent. However, when a workpiece is in contact with both the plates 61 and 62 to complete the electrical circuit, the visual indicator 75 is set to glow or flash and the audible buzzer 76 to sound.

In practicing the invention, means are provided for translating the plates 51, 52 toward each other in order to advance the conductive plates 61, 62 toward the workpiece. To that end, the FIG. 2 embodiment includes a schematically illustrated drive means 80 preferably in the form of a hand wheel, if the device is mechanically operated, or in the form of a motor, in the case of electrical operation, both devices having the necessary gearing in order to provide relative movement between the plates 51, 52. When it is desired to gauge the thickness of the sheet, the plate 52 will be gradually advanced toward the plate 51 until the electrical circuit is completed. After testing, the plate 52 can be raised a predetermined distance from the plate 51 in order to allow removal of the workpiece and insertion of a new workpiece for test.

In order to provide a quantitative measure of the plate thickness, in the event only plate thickness is to be gauged, or of the gross plate thickness, in the event both thickness and nonflatness are to be gauged, means are provided for indicating the thickness t (FIG. 1) defined by the gap between the plates 61, 62 which exists when for a particular workpiece completes the circuit. In the FIG. 2 embodiment, such means are illustrated as a dial indicator 83 which is affixed at 84 to the platen 52, and which has a sensing tip 85 which engages a finished surface on the base plate 51. The dial indicator 83 is mounted with its indicator in contact with the plate 51 and is calibrated to read a predetermined dimension, such as zero, when the planar electrodes 61, 62 are in contact with each other, and therefore can directly read the dimension of the gap t. Alternatively, the dial indicator can be zeroed for the nominal thickness of a plate, and will then read only the out-of-flatness dimension when a workpiece is interposed. Such modes of calibration are only exemplary, and others will occur to those skilled in the gauging and measuring arts.

The system of FIG. 2 can be utilized in the configuration described thus far to provide an indication of gross sheet thickness which includes out-of-flatness, or the out-of-flatness dimension alone, either manually or electronically. When using the gauge in that manner, it is simply necessary to operate the drive means 80 to achieve adequate separation between the planar electrical contacts 61, 62 to allow insertion of a workpiece for gauging. The drive means 80 is then reversed and the contact 62 advanced toward the contact 61 until the electrical circuit 40 is completed. Completion of the circuit can be indicated by the visual indicator 75 or audible indicator 76 or alternatively can be sensed by a connected control system. In any event, at the time the circuit is completed, a measurement is taken to gauge the gap t at which circuit completion was achieved. Preferably, the drive means 80 is stopped at that point in order to allow adequate time to take such measurement. Alternatively, if an automatic control system is utilized, the measuring device can be electrically triggered upon completion of the circuit to record a measurement of the gap at that point in time.

Assuming manual operation, when the indicators 75 or 76 are energized, the drive means 80 is halted to stop the advance of the contact 62 toward the contact 61. As a result, there is no tendency to compress the workpiece by further travel of the contacts toward each other, and the system records true out-of-flatness for the workpiece in its relaxed, non-compressed condition. Upon interruption of the drive means, the operator is then in a position to read the dial indicator 83 which, as described above, can be calibrated to read total gross thickness or simply the contribution of the out-of-flatness dimension to the gross thickness. The operator will then be in a position to determine if the particular workpiece is within standards and can sort the workpiece as either acceptable or rejected according to that determination.

It is also possible of course, and will be described in connection with additional embodiments, to use a nonvisually readable indicator such as a linear electrical position transducer (for example, a linear potentiometer or a linear voltage transformer such as an LVDT device) to provide an electrical signal equivalent to that visually indicated by the dial indicator 83. Such an electrical signal can be used to drive a visual readout device, can print the measured dimension on a quality control report, or can electronically record the measurement for later use.

In many applications, particularly those operated in the steel mill where the environment is much more factory than laboratory oriented, it is preferable to provide a pass/fail measurement device which provides only two indications, one indicating an acceptable part, and the other indicating a part which should be rejected. FIG. 2 illustrates a further means of accomplishing the utilization of the FIG. 2 testing device in a pass/fail manner. To that end, limit means generally indicated at 90 are provided for establishing a pass/fail limit for the parts to be gauged. In the illustrated embodiment, the limit means 90 includes a vernier adjustment screw 91 which is threaded into the upper block 52 and bottomed on the lower plate 51 such that adjustment of the screw 91 sets a fixed mechanical stop 94 beyond which the drive means cannot advance the plates 52, 51 toward each other. It is seen that the planar electrodes 61, 62 are apertured at 92, 93 so that the vernier screw 91 does not provide a short circuit between the conductive plates. Thus, setting of the screw 91 to the position illustrated in FIG. 2 sets a predetermined gap between the planar surfaces of the contacts 61, 62. That planar gap is typically established to be equal to the nominal thickness of the plate being gauged plus the acceptable tolerance in flatness. Thus, if it is desired to measure 22 gauge steel (which is 0.028 inches in thickness) and the acceptable flatness tolerances 0.020 inches, the vernier screw 91 will be set to achieve a gap between the facing surfaces of the electrodes 61, 62 of 0.048 inches. Thus, after the electrodes 61, 62 are separated, and after a workpiece is inserted therebetween, the drive means 80 advances the electrode 62 toward the electrode 61. If the stop 94 is engaged before the circuit 40 is completed, that is a signal that the workpiece is within the tolerances. However, if the indicators 75, 76 are energized before the mechanical stop 94 indicates end of travel, that is a signal that the workpiece in question is out of tolerance and should be rejected. Thus, a worker, even in an adverse environment, can with very little attention simply insert sheets between the electrodes 61, 62 and energize the system to advance the electrodes toward each other. The worker need only respond to the sounding or non-sounding of the indicator to determine whether the part just tested should go into the pass or fail bin.

Figure 3:
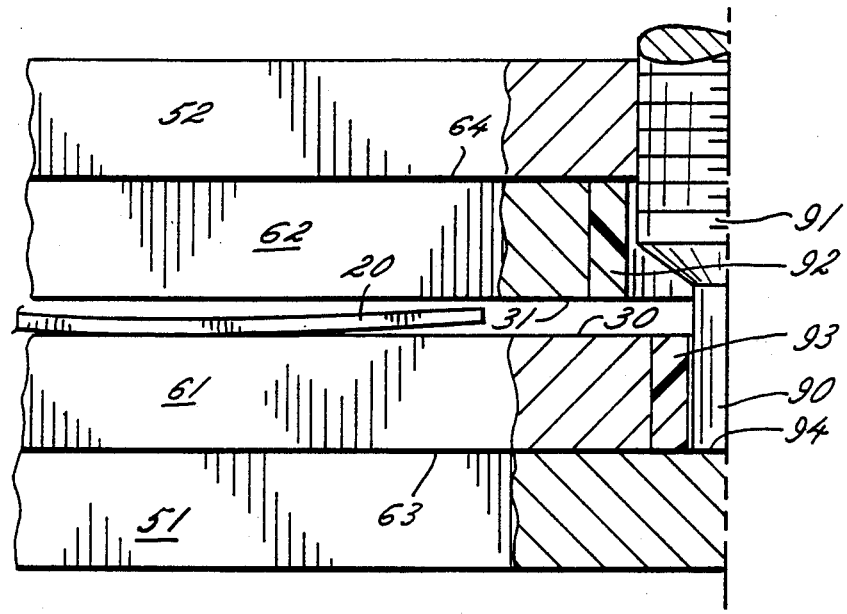
FIGS. 3 and 4 illustrate use of the tester of FIG. 2 with sheets whose flatness is within and without the flatness tolerance range respectively.
Figure 4:
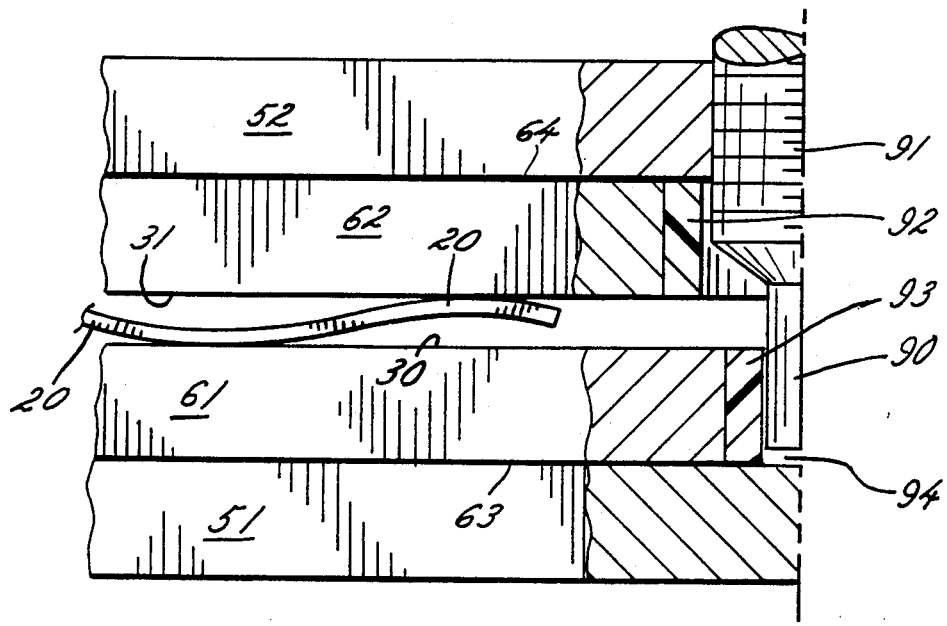

The pass and fail conditions are better illustrated in FIGS. 3 and 4, respectively. It is seen that in FIG. 3 the stop 94 has been engaged, i.e., the bottom of the vernier screw 91 has bottomed on the upper surface of the lower plate 51, while the workpiece 20 is out of in contact with upper contact 62, and therefore has failed to complete the circuit 40. As a result, the indicator will not be sounded and the workpiece 20 has been determined to be acceptable. However, it is seen in FIG. 4 that a workpiece 20 which is less flat than that gauged in FIG. 3, is interposed between the contacts 61, 62 and has completed the circuit 40 before the stop means 94 has been engaged. Thus, the indicator will sound signalling that the workpiece 20 of FIG. 4 has not met the specification and should be rejected.

Figure 5:
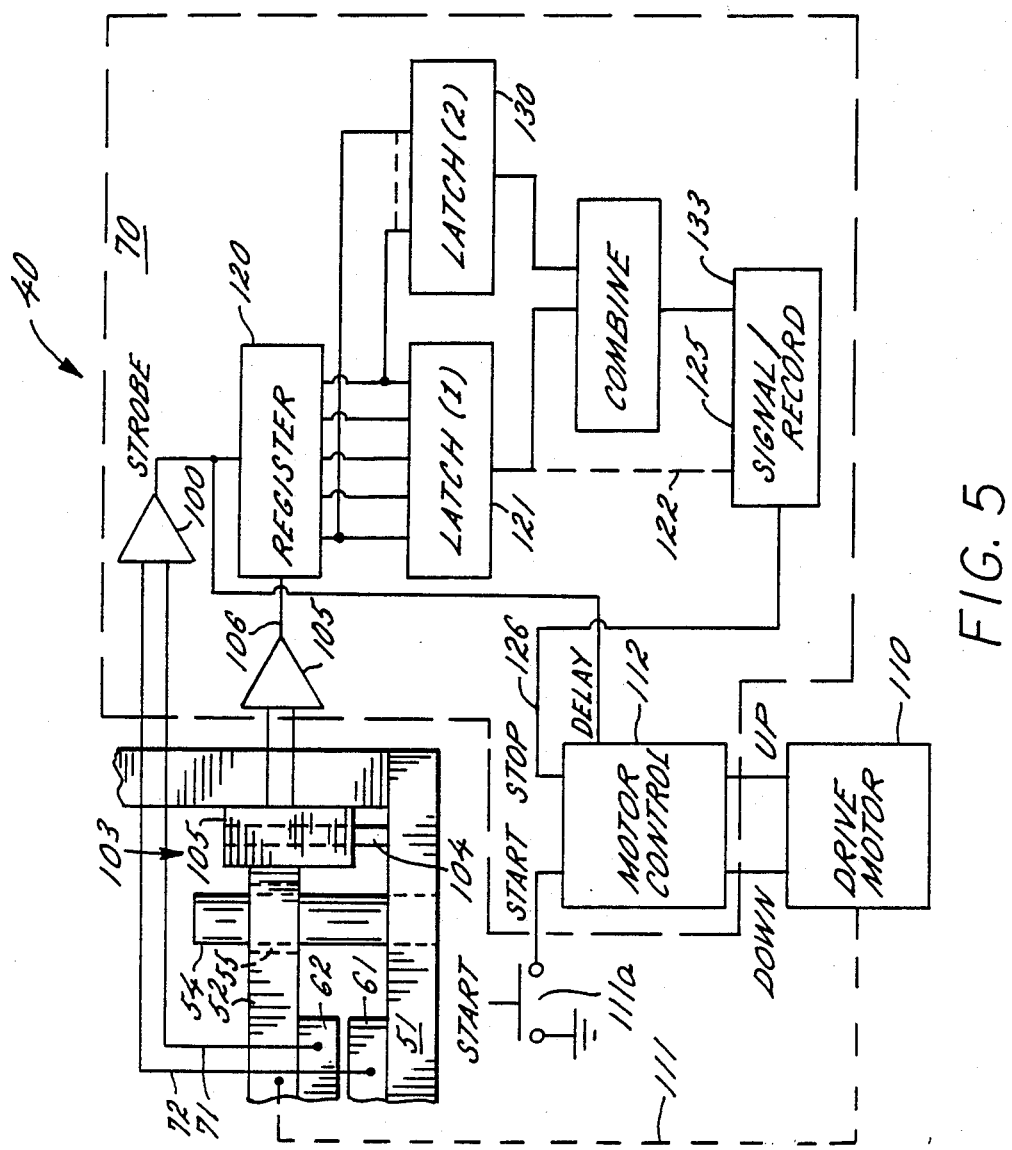
FIG. 5 is a diagram illustrating a further embodiment of the present invention utilizing electronic rather than mechanical means for setting sheet thickness and flatness tolerance ranges.

Turning now to FIG. 5, there is shown a further embodiment of the present invention which includes certain electrical/electronic elements which are the full equivalent of the electromechanical system of FIG. 2. FIG. 5 shows only a portion of the displaceable plates and supporting frame, as is necessary for an understanding of the present embodiment. There is shown a portion of the base plate 51 and platen 52 with attached planar electrodes 61, 62, respectively. One of the guide rods 54 and its associated linear bearing 55 is also schematically illustrated.

FIG. 5 also shows the electrical circuit 40 as including conductors 71, 72 connecting the respective contacts 61, 62 to a control system shown within dashed box 70. Completion of the electrical circuit 40, i.e., sensing of a connection between the lead 71, 72 by virtue of an interposed workpiece between the contacts 61, 62 is sensed by electronic means such as an amplifier 100 which produces a strobe signal on its output indicating that the circuit 40 has been completed.

The embodiment of FIG. 5 shows a motor control including a drive motor 110 having a mechanical connection shown as dashed line 111 to the platen 52 for controlling the relative positioning of the plates 51, 52 with respect to each other. It is seen that a start pushbutton 111a is provided which when temporarily actuated causes a motor control circuit 112 to energize the drive motor 110 in a first direction to drive the platen 52 downwardly toward the base plate 51. It is seen that the motor control 112 also has a delay input labeled D which is connected to the strobe output of the amplifier 100. Thus, whenever the circuit 40 is completed, the strobe signal generated by amplifier 100 acts on the delay input of motor control 112 to stop the drive motor 110 in its current position, thereby allowing a measurement of the gap to be taken. It will be noted at this point that when using electronic recording circuitry, the delay can be achieved simply by switching from the down to up mode of the motor control 112 since the measurement can be taken so quickly that adequate delay is achieved simply by instantaneously reversing the motor.

The embodiment of FIG. 5 includes position indicating circuitry equivalent to the dial indicator 83 of FIG. 2, such position indication circuitry being shown as an electrical transducer 103 such as an LVDT electrical transducer which produces an electrical signal related to the relative position of an internal plunger 104 within a bore in cylindrical housing assembly 105. In place of an LVDT sensor, it will be apparent that an analog or digital potentiometer can be utilized. In any event, it is seen that one of the elements of electrical transducer, in the illustrated embodiment the plunger 104 is affixed to the base plate 51 whereas the cylindrical housing member 105 is affixed to the platen 52 such that the relative position between the plates 51, 52 establishes the relative position between the elements 104, 105 and thus the magnitude of the signal produced by the transducer 103.

The signal produced by the transducer 103 is thus a measure of the gap between the planar surfaces of the electrodes 61, 62. That signal is buffered by the amplifier 105. The buffer 105 is intended in a general sense. If the signal produced by the transducer 103 is digital, a simple digital buffer will be adequate. In the event the transducer 103 is analog, the buffer 105 will also preferably include an analog-to-digital converter so that the remaining signals can be processed in a digital fashion. In the preferred embodiment, the output of the buffer 105 is intended to be a digital signal at 106 representative of the gap between the planar surfaces of electrodes 61, 62 and thus a measure of thickness t which defines a gross measure of flatness deviation and thickness of the workpiece.

The thickness measurement derived through buffer 105 can be processed in a number of ways. In the FIG. 5 embodiment, it is applied to a register 120 which has a strobe input connected to the output of buffer 100. Thus, the position signal produced by the transducer 103 at the time the circuit 40 is completed is strobed into the register 120 for later processing. In one embodiment of the invention, the signal strobed into register 120 is simply stored within a latch 121 where it is passed by dashed connections 122 to an indicator device 125. In the FIG. 5 embodiment, the indicator device 125 is stated to be a signal or record device and thus can produce not only the audible or visual signal described in connection with prior embodiments, but also a visible or computer readable record on paper or magnetic tape or magnetic disk as the needs of a particular system demand. Thus, in the embodiment as it has been described thus far, the total thickness t established between the electrodes 61, 62 is recorded at the time the circuit 40 is first completed. That can be processed by computerized circuitry which has a record of the nominal thickness of the plates then being measured to produce a record of the out-of-flatness variations for a particular run. It is seen that the signal/record circuitry 125 also has an output 126 which is coupled to the motor control 112 to energize the drive motor 110 to drive the upper plate 52 upwardly after the measurement has been recorded. This allows removal of the workpiece which has been gauged and insertion of a new workpiece to be gauged.

In instances where the circuitry within enclosure 70 is intended to perform additional functions in the gauging, a second latch 130 is provided which is responsive to the register 120 as illustrated in FIG. 5 or alternatively can be responsive to a set of thumbwheel switches which are settable by the operator. The purpose of the latch 130 is to provide a measurement related to nominal sheet thickness (or nominal thickness plus allowable flatness tolerance) for combination with the total thickness t measured by the device. Thus, the second register 130 can function as an equivalent of the mechanical limit means described in connection with FIGS. 2-4 in a pass/fail mode of operation. Alternatively, the electronic limit can be combined with the measured gross thickness so that a resulting thickness can be produced which is only that related to the out-of-flatness condition of the sheet. Thus, if 24 gauge steel (0.025 inches in thickness) is being gauged, the latch 130 will be provided with dimensional information relating to 0.025 inches. As noted above, that can be dialed in via thumbwheel switches, or the plates 51, 52 manually adjusted to a position wherein the thickness t is precisely 0.025 inches, indicating a perfectly flat workpiece, at which point a strobe button is depressed to store that dimension in the latch 130. Thus, latch 130 contains reference information relating to nominal thickness of the workpiece whereas latch 121 contains total thickness including workpiece thickness and out-of-flatness thickness. Those dimensional signals are combined in a register or comparator 132 which, for example, takes the difference between the two signals to produce a signal on output 133 which relates only to the out-of-flatness condition. It is that signal which is coupled to the signal/record device 125 for recordation or for generating a signal if the total is above or below a predetermined allowable tolerance.

It will be appreciated that the device of FIG. 5 can be operated in the pass/fail mode simply by inserting into the latch 130 a dimension which is equal to the total of the workpiece nominal thickness and allowable out-of-flatness tolerance. That dimension is inserted in latch 130 and serves as a standard against which all gauged workpieces are compared. If the information which results from a measurement and is stored in latch 121 is less than that stored in latch 130, the workpiece is determined to be passable, and the signal/record device 125 so indicates. Alternatively, if the dimension of the workpiece gauged at the time the circuit 40 is completed, which dimension is stored in latch 121, is found to be greater than the maximum allowable stored in latch 130, the signal/record device 125 so signals, and the workpiece just gauged is rejected.

It will now be apparent that what has been provided is a very versatile and reliable thickness and flatness gauging device. The device can be used with relatively thin sheet metal such as 24 gauge metal which is easily deformed even by hand. It is not substantially deformed in the gauge because as soon as the planar contacts which sandwich the sheet to be measured engage the sheet, the measurement is taken before further travel of the contacts toward each other deforms the workpiece. The measured dimension, which has resulted from initial contact between two planar contacts bracketing the workpiece, is stored and recorded as a measure of the total out-of-flatness of the piece. Furthermore, the recorded value relates to the maximum out-of-flatness dimension because the planar electrical contacts which bracket the sheet, because of their parallel travel toward each other, will engage the sheet which is resting on the lowermost contact at its uppermost projection to determine the maximum out-of-flatness condition. That dimension is often of significant importance in end use application of the workpieces when multiple workpieces are stacked together, and individual localized gaps are of less significance than gross deviations across a larger plane, which gross deviations are difficult to detect by feeler gauges and the like.

The numerous modes of operation which are available for the flatness gauge according to the invention provide not only the opportunity for measuring and recording highly accurate dimensions for each tested workpiece, but, when utilized in other modes such as in the factory, can be used in such a way as to reliably test workpieces in a high production environment with minimum attention of the operator.

What is claimed is:

1. A planar thickness gauge for a conductive planar workpiece of predetermined nominal thickness, the workpiece being an electrical conductor, the gauge tester comprising the combination of:
   a base plate including a first planar electrical contact for supporting the workpiece over a substantial portion of its planar area,
   a thickness measuring platen including a second planar electrical contact,
   the planar electrical contacts being mounted generally parallel to each other, means for relatively displacing the electrical contacts in parallelism to encompass a workpiece disposed on the base plate, guide means for interconnecting the base plate and platen for assuring parallel displacement of the planar electrical contacts with respect to each other, an electrical circuit including the first and second planar electrical contacts to be completed by the workpiece when both of said contacts are in contact with the workpiece, the electrical circuit including means for initiating a measurement of the gap between the electrical contacts upon completion of the electrical circuit as a measure of the planar thickness of the workpiece.

2. The combination as set forth in claim 1 wherein the guide means includes linear bearing means interconnecting the base plate and platen.

3. The combination as set forth in claim 1 further including dial indicator means for providing a readout of the gap between the first and second planar electrical contacts.

4. The combination as set forth in claim 1 further including electrical transducer means for providing a signal representative of the gap between the first and second planar electrical contacts, and processor means responsive to said signal for providing an indication of the gap between the planar electrodes at the time said electrical circuit is completed.

5. The combination as set forth in claim 1 further including limit means including a vernier adjustment for establishing a set gap between the planar electrical contacts which includes the nominal thickness of the workpiece and the allowable tolerance for out-of-flatness, thereby allowing adjustment for different workpiece thicknesses and out-of-flatness tolerances.

6. The combination as set forth in claim 5 further including electrical signalling means for providing an indication that said circuit has been completed, thereby to signal the operator the workpiece exceeds the thickness and out-of-flatness tolerance.

7. The combination as set forth in claim 6 wherein the signalling means provides an audible or visible indication that said circuit has been completed.

8. The combination as set forth in claim 1 wherein relative displacement of the planar electrical contacts toward each other to encompass the workpiece is terminated upon completion of said electrical circuit, thereby to prevent compression of the workpiece prior to measurement of the thickness thereof.

9. A flatness tester for a conductive planar workpiece of predetermined nominal thickness, the workpiece being an electrical conductor, the tester comprising the combination of:

a base plate including a planar electrical contact for supporting the workpiece over a substantial portion of its planar area, a thickness measuring platen including a second planar electrical contact, the planar electrical contacts being mounted generally parallel to each other, the base plate and platen being generally displaceable with respect to each other for moving the planar electrical contacts toward each other while maintaining parallelism to encompass a workpiece disposed on the base plate, limit means for establishing a predetermined gap between the electrodes, the gap being dimensioned to accommodate for the workpiece nominal thickness and an allowable out-of-flatness tolerance, an electrical circuit including the first and second planar electrical contacts to be completed by the workpiece when both of said contacts are in contact with the workpiece, the limit means preventing completion of said circuit if the thickness and out-of-flatness dimension of the workpiece is less than the thickness and tolerance associated with the limit means, and means for indicating the completion of the electrical circuit as a means for detecting a workpiece which has a out-of-flatness exceeding the allowable tolerance.

10. The combination as set forth in claim 9 further including linear bearing means interconnecting the base plate and platen for assuring parallel displacement of the planar electrical contacts with respect to each other.

11. The combination as set forth in claim 9 further including dial indicator means for providing a readout of the gap between the first and second planar electrical contacts.

12. The combination as set forth in claim 9 further including electrical transducer means for providing a signal representative of the gap between the first and second planar electrical contacts, and processor means responsive to said signal for providing an indication of the gap between the planar electrodes at the time said electrical circuit is completed.

13. The combination as set forth in claim 9 further including vernier adjustment means associated with the limit means for establishing the predetermined gap to include the nominal workpiece thickness and the allowable out-of-flatness tolerance thereby allowing adjustment for different workpiece thicknesses and tolerances.

14. The combination as set forth in claim 13 wherein the vernier adjustment means includes a calibrated dial associated with the limit means for establishing a mechanical stop for limiting the minimum gap between the planar electrical contacts to include the nominal workpiece thickness and the allowable out-of-flatness tolerance.

15. The combination as set forth in claim 14 wherein the indicating means has a pass mode for indicating the engagement of the mechanical stop prior to completion of the electrical circuit, thereby to indicate that the workpiece is within the allowable tolerance.

16. The combination as set forth in claim 15 wherein the indicating means has a fail mode for indicating that the electrical circuit has been completed prior to engagement of the mechanical stop, thereby signalling that the workpiece is outside of the allowable tolerance.

17. The combination as set forth in claim 13 wherein the vernier adjustment means includes electronic storage means for storing information relating to the predetermined gap for setting an electronic comparison standard related to the minimum allowable gap between the planar electrodes.

18. The combination as set forth in claim 17 wherein the indicating means has a pass mode for indicating a comparison between the workpiece and the stored standard in which the workpiece is within the stored standard, thereby to indicate that the workpiece is within the allowable tolerance.

19. The combination as set forth in claim 18 wherein the indicating means has a fail mode for indicating a comparison between the workpiece and the stored standard in which the workpiece is outside the stored standard, thereby signalling that the workpiece is outside of the allowable tolerance.

20. The combination as set forth in claim 9 wherein relative displacement of the electrical contacts toward each other to encompass the workpiece is terminated upon completion of said electrical circuit, thereby to prevent compression of the workpiece prior to measurement of the thickness and out-of-flatness dimension thereof.

21. A planar thickness gauge for a planar workpiece of predetermined nominal thickness, the gauge comprising the combination of:
- a base plate including a planar support member for supporting the workpiece over a substantial portion of its planar area,
- a thickness measuring platen including a planar contact member,
- the planar support and contact members being mounted generally parallel to each other, means for relatively displacing said planar members in parallelism to encompass a workpiece disposed on the base plate, guide means for interconnecting the base plate and platen for assuring parallel displacement of the planar electrical contacts with respect to each other,
- an electrical circuit including the planar support and contact members activated by contact between the workpiece and both said planar members for initiating a measurement of the gap between said planar members as a measure of the planar thickness of the workpiece.

* * * * *